United States Patent
Roelleke et al.

(10) Patent No.: US 7,140,637 B2
(45) Date of Patent: Nov. 28, 2006

(54) METHOD FOR TRIGGERING RESTRAINING MEANS IN A MOTOR VEHICLE

(75) Inventors: Michael Roelleke, Leonberg-Hoefingen (DE); Armin Koehler, Sachsenheim (DE)

(73) Assignee: Robert Bosch GmbH, Stuttgart (DE)

( * ) Notice: Subject to any disclaimer, the term of this patent is extended or adjusted under 35 U.S.C. 154(b) by 296 days.

(21) Appl. No.: 10/433,286

(22) PCT Filed: Oct. 18, 2001

(86) PCT No.: PCT/DE01/03982

§ 371 (c)(1), (2), (4) Date: Nov. 13, 2003

(87) PCT Pub. No.: WO02/43992

PCT Pub. Date: Jun. 6, 2002

(65) Prior Publication Data

US 2004/0065497 A1    Apr. 8, 2004

(30) Foreign Application Priority Data

Nov. 30, 2000    (DE) ................................ 100 59 426

(51) Int. Cl.
*B60R 21/01* (2006.01)
*B60R 21/32* (2006.01)

(52) U.S. Cl. .................. 280/735; 701/45; 180/282; 180/274

(58) Field of Classification Search ............. 280/735; 701/45; 180/274, 282

See application file for complete search history.

(56) References Cited

U.S. PATENT DOCUMENTS

| 5,626,359 | A  | * | 5/1997  | Steffens et al. ............. 280/735 |
| 6,095,551 | A  |   | 8/2000  | O'Docherty |
| 6,123,357 | A  | * | 9/2000  | Hosoda et al. ........... 280/730.2 |
| 6,186,539 | B1 | * | 2/2001  | Foo et al. .................... 280/735 |
| 6,302,439 | B1 | * | 10/2001 | McCurdy .................... 280/735 |
| 6,327,527 | B1 | * | 12/2001 | Imai et al. ..................... 701/45 |
| 6,463,372 | B1 | * | 10/2002 | Yokota et al. ................ 701/45 |
| 6,549,836 | B1 | * | 4/2003  | Yeh et al. ...................... 701/45 |
| 6,711,485 | B1 | * | 3/2004  | Feser et al. ................... 701/45 |
| 6,898,498 | B1 | * | 5/2005  | Wessels et al. ............... 701/45 |

FOREIGN PATENT DOCUMENTS

| DE | 196 10 833  | 9/1996 |
| DE | 197 40 020  | 3/1999 |
| DE | 199 09 538  | 9/2000 |
| WO | WO 90/11207 | 10/1990 |
| WO | WO 97 21566 | 6/1997 |
| WO | WO 99 03711 | 1/1999 |
| WO | WO 00/13944 | 3/2000 |

* cited by examiner

*Primary Examiner*—Ruth Ilan
(74) *Attorney, Agent, or Firm*—Kenyon & Kenyon LLP

(57) ABSTRACT

A method for triggering a restraining device in a motor vehicle is proposed, where a crash severity and an occupant categorization are implemented independently of each other. By linking the crash severity with the occupant categorization, the restraining device required for the vehicle occupants is triggered. The crash severity is subdivided in accordance with the triggering events frontal impact, side impact, rear impact or vehicle roll-over. A decisive advantage is that the crash severity is implemented independently of the occupant categorization.

6 Claims, 3 Drawing Sheets

METHOD FOR TRIGGERING RESTRAINING MEANS IN A MOTOR VEHICLE

FIELD OF THE INVENTION

The present invention is based on a method for triggering restraining means in a motor vehicle according to the definition of the species in the independent claim.

BACKGROUND INFORMATION

It is already known to use vehicle sensors, such as acceleration sensors, to detect a crash by comparing sensor signals from these acceleration sensors to predefined threshold values. Furthermore, it is known to use vehicle sensors for occupant categorization in the manner of a seat mat in a vehicle seat.

German Published Patent Application No. 197 40 020 describes a device for activating an airbag system in a motor vehicle, which activates the restraining means as a function of the impact situation or the impact intensity and the occupant position. In German Published Patent Application No. 196 10 833, it is stated that the impact velocity determines the gas quantity used to inflate an airbag.

From PCT Publication No. 99/03711 it is known to take the weight of a vehicle occupant into account in the deployment of restraining means in a collision. From German Published Patent Application No. 197 40 020 it is known to activate an airbag as a function of instantaneous data from the impact-detection device and/or of instantaneous data of a device for occupant or object detection. From PCT Publication No. 97/21566, it is known to protect a vehicle occupant individually from the effects of a traffic accident. In this case, the instantaneous circumstances of the crash situation are taken into account, especially those parameters that determine the individual kinetic energy of the vehicle occupant.

SUMMARY OF THE INVENTION

In contrast, the method according to the present invention for triggering restraining means in a motor vehicle having the features of the independent patent claim has the advantage over the related art that the sensor signals are used to determine a crash severity, in this manner allowing a better activation of the required restraining means, which, if appropriate, are able to be switched in stages or in a continuous manner. This means that the restraining means are activated in such a way that an optimal protection is obtained in view of the determined crash severity.

Furthermore, it is advantageous that, by combining the detected crash severity with the occupant categorization, an optimal use of the restraining means takes place in that the crash severity and the occupant categorization are interlinked so as to address the required restraining means alone. This makes it possible, on the one hand, to determine how the person is seated and which classifying features the person exhibits and, on the other hand, to use a possible crash severity, the occupant categorization and the crash severity both being determined independently of one another. Thus, in an advantageous manner, no restraining means will be triggered if such a triggering does not protect a person.

Moreover, it is advantageous that this also makes it possible to take time sequences into consideration in the deployment of restraining means in that, for instance, it is detected with the aid of the sensor signals when a second stage of an airbag must be fired in order to obtain maximum protection.

Due to the separation of the crash-severity detection from the occupant categorization, the method according to the present invention allows a modular and structured set-up of the required algorithms. The crash-severity detection and the occupant categorization are kept separate from one another until they are ultimately linked to one another to address the required restraining means. In this way, the lack of, for instance, data from a sensor will have an effect only when the crash-severity detection and the occupant categorization are linked. It is then possible to trigger, in a more or less adapted manner, the restraining means as a function of the quality of the crash-severity detection and the occupant categorization.

Advantageous improvements of the method of triggering restraining means in a motor vehicle, indicated in the independent claim, are rendered possible by measures and further refinements specified in the dependent claims.

It is particularly advantageous that the first sensor signals, which are used to determine the crash severity, record operating dynamics data, a vehicle intrusion and ambient environment data of the vehicle. Here, operating dynamics data are accelerations of the linear and circular type, so that brake processes and roll-over processes are thereby recorded as well. Intrusion means that a foreign object collides with the vehicle, possibly indenting the passenger cabin, and a so-called intrusion thereby takes place. A respective example is a pressure sensor accommodated in a side panel of a motor vehicle to detect the air compression in the side panel in the event of a collision. Ambient environment data of the vehicle are detected by image sensors, ultrasound or, for example, radar, so as to detect objects colliding with the vehicle as early as possible prior to the collision and to still prevent such a potential collision. These sensor data provide comprehensive information about the vehicle as well as the environment and especially collision data, which result in a crash-severity determination and estimation. It is also possible to assign crash-severity data to each of the individual triggering events, which are then entered into the linkage with the categorization of vehicle occupants. A crash may consist of a combination of the triggering events.

Moreover, it is advantageous that with the aid of additional sensor signals the weight, the seating position and the use of a seat belt are utilized for the purpose of occupant categorization. On this basis, a comprehensive image of the respective occupant may be obtained on the basis of which a complete categorization may be implemented. For instance, persons may be subdivided into three different categories. For one, there is the child which is not to be protected by an airbag so as to avoid an injury caused by the airbag; there is a women weighing 100 lbs who is able to be protected by an airbag with a weak pressure increase without being injured; and there are the other persons who are protectable by an airbag-stage having a higher pressure increase without risking injury to themselves, since they are usually further away from an airbag module. An example of a sensor to be used here are pressure-dependent resistance elements in a seat mat of a respective vehicle seat, by which it is possible to generate seat profiles from which the weight of the respective person, the seat occupancy and also the seating position may be inferred. However, optical or ultrasound sensors may be used as well. By utilizing an additional appropriate sensory system it is possible to ascertain whether or not a seat belt was used.

Furthermore, it is advantageous that a device is provided which includes the requisite elements for implementing the method described above.

DETAILED DESCRIPTION

Due to the increasing use of a growing number of airbags in a motor vehicle, it is necessary to activate these airbags in the most appropriate manner in a given situation. Even the fact that airbags are able to be fired in stages means that this degree of freedom in the activation should be implemented as a function of the crash situation and the respective vehicle occupants, this situation being determined in each case by a possible crash severity and the individual occupants. A frontal or side collision constitutes a potentially greater crash severity for an occupant than a rear collision. On the basis of the weight of the person, appropriate restraining forces may be exerted on the person, especially given multi-stage airbags, so as to ensure optimum protection, without the occupant being injured by the restraining means.

According to the present invention, a method for triggering restraining means in a motor vehicle, therefore, is employed in which the crash severity and the occupant categorization are implemented independently of one another. This ensures that no retrospective effect or fault propagation occurs when the two parameters are determined, due to a faulty or missing sensor value. Linking the crash severity to the occupant categorization allows an individual activation of the respective restraining means. This also means that this linkage permits an activation as a function of time when multi-stage airbags are used.

Figure 1:
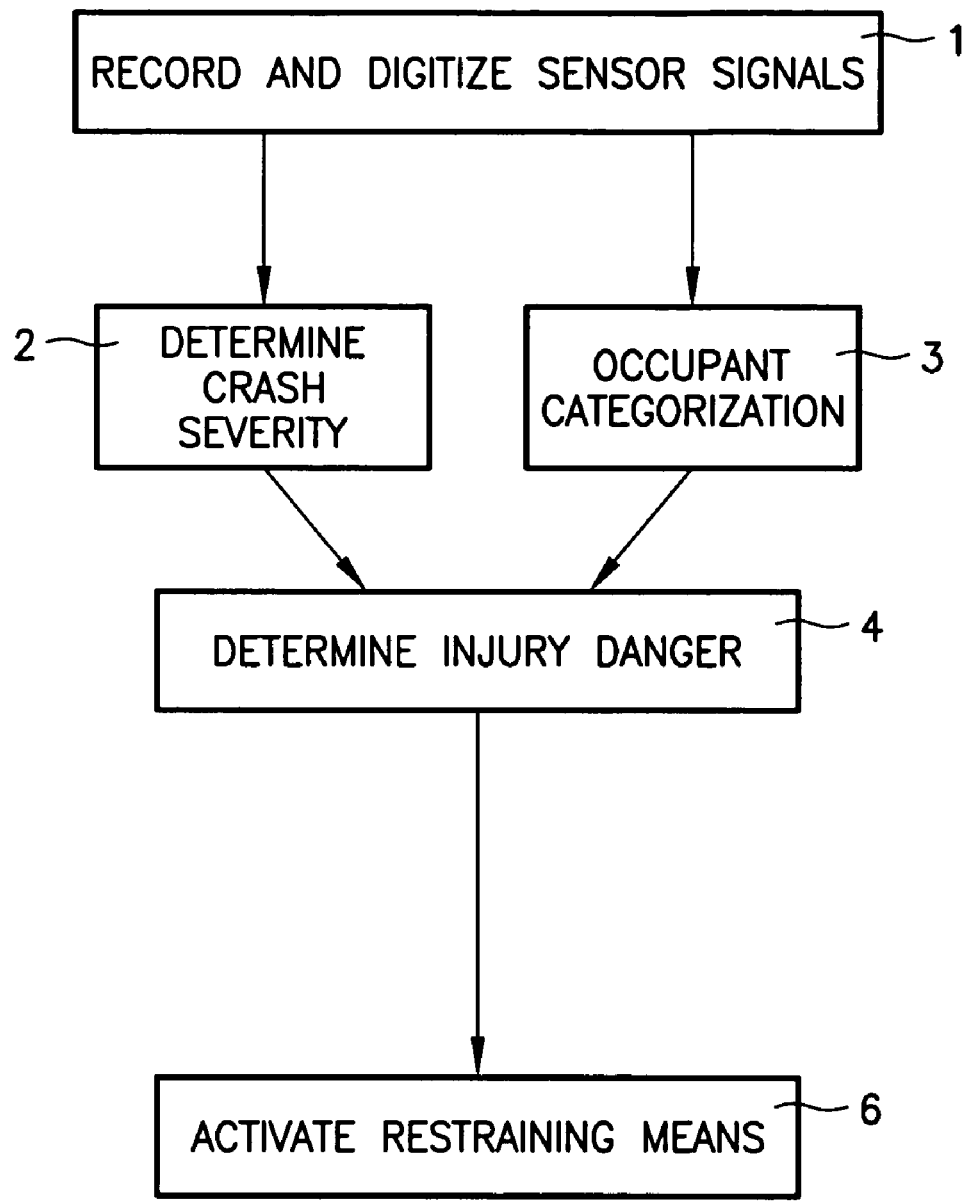
FIG. 1 shows a flow chart of the method according to the present invention.

In FIG. 1, the method of the present invention for triggering of restraining means in a motor vehicle is represented as a flow chart. In a first step, various sensor signals are recorded and digitized. In this case, acceleration sensors, engine speed sensors, radar sensors, ultrasound sensors and a side-impact sensory system such as pressure sensors are used, which are distributed over the vehicle and may also be located in the control device of the restraining means. The method according to the present invention is implemented in the control device.

However, many other sensor principles suitable to detect the severity of a crash may be used. In this context, the vehicle sensors must detect one of the four events, such as frontal impact, side impact, rear impact or roll-over, or at least make these detectable by combining the sensor signals.

In method step 2, the control device of the restraining means determines the crash severity from these sensor signals. Special categorization approaches, or the exceeding of dynamic and static threshold values, may be used in the consideration of the exceeding time.

The sensor signals in each case are evaluated via a separate signal preprocessing and then assigned to one of the four triggering events mentioned above on the basis of the detected characteristics. The assignment is linked to a signal linkage, which results in a determination of the respective crash severity. Depending on the capability of the used sensory system, the crash severity may be carried out to varying grades and resolutions.

The classification of a crash severity may be implemented on the basis of a feature analysis. For instance, using the wavelet transformation on crash-acceleration signals provides information regarding the maximum signal energies and average signal energies in different frequency bands of the signal. These then constitute characteristic data for the individual crash types, and, when combined, may be used to classify or detect a crash severity. For each frequency band, two features are then at hand. The individual crash types may subsequently be identified on the basis of these features. Crashes may be divided into types, each crash type having a set of features. The features detected by a vehicle sensor are compared to these stored features, differences being formed between the detected and the stored features. Therefore, energy differences are ascertained. These differences must be below a predefined threshold value in order to identify a crash type and, thus, the crash severity. That is, all the features of a set for a crash must show a difference that is below this first threshold value. Only then will it be possible to identify the respective crash type. The crash types are structured such that an identification will always be possible, at least one crash type also representing a non-trigger. These are crash types that do not entail a triggering of the restraining means.

Figure 3:
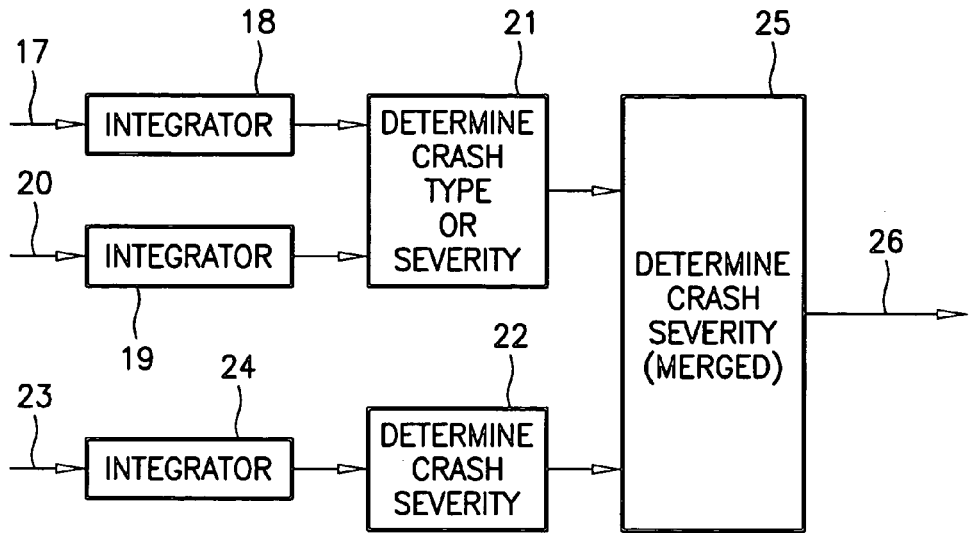
FIG. 3 shows a block diagram of the preprocessing of sensor signals.

FIG. 3 shows a block diagram of the signal-preprocessing of acceleration signals. Acceleration signals from remote acceleration sensors, that is, acceleration sensors located outside of the control device of the restraint system, are received at inputs 17 and 20, to be integrated in each case in integrators 18 and 19. A crash type or crash-severity information of this sensor is determined with the aid of the integrated signal in block 21. This crash type may be subdivided on the basis of the integrated signal, for instance by a predefined delay time and the gradient. The detected crash type is then forwarded to block 25, which determines the crash severity, for which it also uses the signal that is applied to signal input 23. This signal is an acceleration signal generated in the control device by a sensor located therein. It is also possible to use two acceleration sensors here, which are positioned perpendicularly to each other, so as to detect the accelerations in the direction of travel and in the lateral direction.

This signal is likewise integrated in block 24, then to be assigned in block 22 to a crash severity on the basis of its characteristic curve. To obtain the crash severity, a comparison of the integral to a threshold formed from the acceleration signals is implemented. However, other approaches for classifying signals are conceivable as well. This crash severity is then transmitted to a second data input of block 25, which implements a merged crash-severity classification from these two crash-severity classifications. In this way, different sensors, sensing signals independently of one another, are linked with respect to their signals as well as the ensuing results, in order to determine the overall crash severity. The crash severity is then available as a value between zero and one or between zero and one hundred percent. On this basis, the severity of a crash is estimated. In particular, it is also possible here that in a crash both a frontal impact and a side impact are each assigned a particular crash severity at the same time.

In FIG. 1, the occupant categorization is implemented in method step 3, which runs in parallel to method step 2. Here, the occupant categorization is implemented using a seat mat which is located in a respective vehicle seat. The seat mat is provided with pressure-responsive resistors which generate a seat profile of the person or the object occupying the vehicle seat. This seat profile is calculated and evaluated by a control unit assigned to the seat mat. The weight, the seating position and the use of a seat belt, whose deployment is registered by an additional sensor, are taken into account here. The position determination is particularly important with respect to the area taken up by the inflated airbag. If, during the airbag inflation, an occupant is present in this area, which is also referred to as keep-out-zone a contact with the rapidly unfolding airbag takes place. This may result in severe injuries, so that an airbag inflation should be avoided in these cases under all circumstances. This monitoring may be implemented in a static or dynamic manner.

Figure 4:
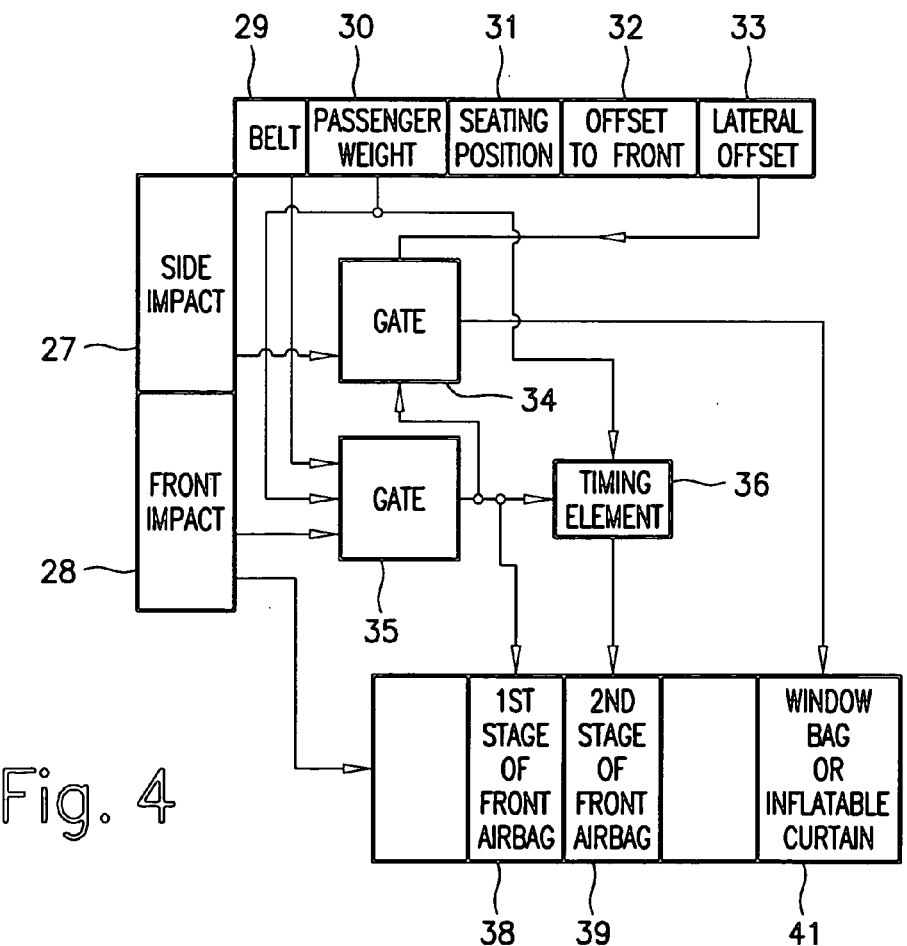
FIG. 4 shows a triggering matrix for activating the restraining means.

In FIG. 1, in method step 4, an injury danger is determined based on the crash severity and the occupant categorization. This injury danger is realized here via a matrix for activating the restraining means. FIG. 4 shows such a matrix. In a left column, the potential triggering events, side impact 27 and frontal impact 28, are stored, these crash events being weighted here with a percentage expressing the crash severity. The other accident or triggering events may be added as well so as to be integrated in the linkage.

In the upper line, in fields 29, 30, 31, 32 and 33, the occupant-categorization features, namely use of belt 29, passenger weight 30, seating position 31, offset to front 32 and lateral offset 33, are represented. In gate 34, lateral offset 33, the crash severity of side impact 27 and the result of an additional linkage are linked to each other to activate, if appropriate, a window bag or inflatable curtain, which is represented by field 41. A window bag or an inflatable curtain is an airbag which unfolds from the vehicle ceiling above the side window or the B-column to provide protection between a vehicle occupant and side part of the vehicle.

The information regarding the use of a belt 29, the weight of the respective person 30 and the crash severity with respect to a frontal collision 28 are linked to each other in gate 35 in order to possibly trigger the first stage of the front airbag 38, for instance in the steering wheel. In addition to being connected to gate 34, gate 35, via its data output, is also connected to timing element 36. Timing element 36 delays the signal by a predefined value to then trigger the second stage of front airbag 39. Weight 30 is also directly forwarded to timing element 36, so that both the first and also the second airbag stage are able to be triggered in accordance with the predefined value.

The linkages are based on previous simulations and tests, with fuzzy logic concepts being especially applicable here. The linking in gates 34 and 35 is then implemented on the basis of this information regarding the effects of a crash severity on an occupant. Tables are then available in the control device, which, depending on the signals that are available at the inputs of gates 34 and 35, specify the assignment and activation of the restraining means. In the simplest case, this may be done by logical linkings. Additional linkings are possible.

In method step 6, the activation of the required restraining means, which were determined by the triggering matrix, is finally implemented.

Figure 2:
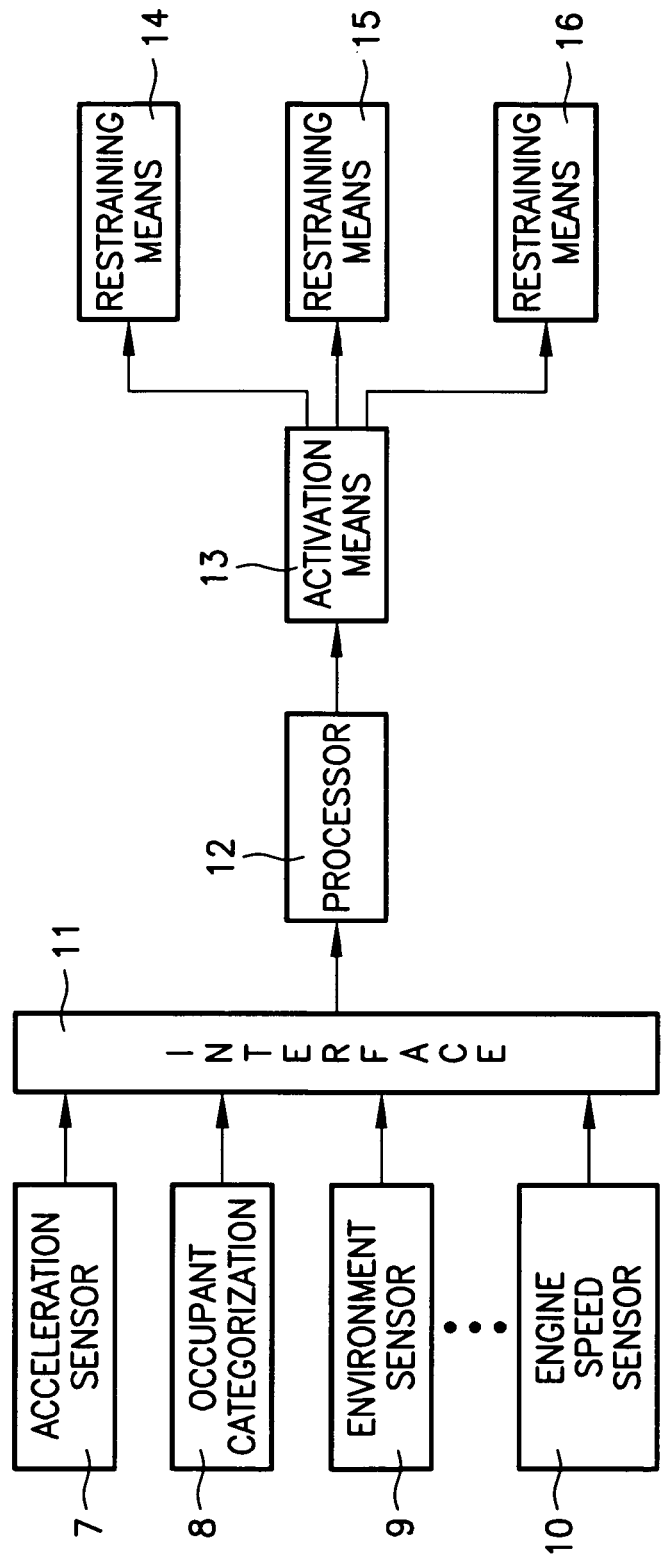
FIG. 2 shows a block diagram of the device according to the present invention.

FIG. 2 shows the device according to the present invention for implementing the method in the form of a block diagram. An acceleration sensor 7, an occupant categorization (seat mat) 8, an environment sensor 9 and an engine speed sensor 10 are shown by way of illustration here and are able to be connected to an interface 11 of an airbag control device. It is possible to include a multitude of additional sensors, which then leads to a finer activation of the required restraining means. Interface unit 11 forms a multiplex from the sensor signals, which is evaluated by processor 12 connected to the data output of interface element 11. Processor 11 implements the afore-described method, i.e., determines the crash severity, the occupant categorization and its linking, in order to then activate the respective restraining means 14, 15, 16 via activation means 13, in a manner that is appropriate for the situation.

What is claimed is:

1. A method for triggering a restraining device in a motor vehicle, comprising:
    detecting a crash as a function of at least one first sensor signal from at least one first vehicle sensor;
    implementing a categorization of a vehicle occupant on the basis of at least one second sensor signal from at least one second vehicle sensor;
    determining a crash severity on the basis of at least one triggering event corresponding to at least one of a frontal impact, a side impact, a rear impact, and a vehicle roll-over detected in accordance with the at least one first sensor signal;
    linking the categorization of the vehicle occupant and the crash severity in order to trigger the restraining device required for the vehicle occupant;
    additionally determining the crash severity as a function of a crash type, which is ascertained on the basis of a feature extracted from the at least one first sensor signal, in that a difference is formed between the extracted feature and a stored feature; and
    comparing the difference to a predefined threshold value.

2. The method as recited in claim 1, further comprising:
    ascertaining at least one of operating dynamics data, intrusion data, environment data of the motor vehicle from the at least one first sensor signal to determine the at least one triggering event.

3. The method as recited in claim 1, further comprising:
    prior to the linking of the crash severity to the categorization, determining the crash severity for each of the at least one triggering event.

4. The method as recited in claim 1, wherein:
    the categorization is dependent on a weight of the vehicle occupant, a seating position, and a use of a vehicle belt.

5. A system for triggering a restraining device in a motor vehicle, comprising:
    at least one first sensor;
    at least one second sensor; and
    a processor connected to the at least one first sensor and the at least one second sensor, the processor determining a crash severity and implementing a categorization of a vehicle occupant on the basis of at least one first control signal and at least one second control signal, wherein:
        the processor links the crash severity and the categorization of the vehicle occupant in order to trigger the restraining device,
        the processor additionally determines the crash severity as a function of a crash type that the processor determines on the basis of a feature extracted from the at least one first control signal,
        the processor forms a difference between the extracted feature and a stored feature, and
        the processor compares the difference to a threshold value.

6. The system as recited in claim 5, wherein:
    the at least one first vehicle sensor detects at least one of vehicle dynamics data, intrusion data, and environment data of the motor vehicle to determine the crash severity in the motor vehicle, and
    the at least one second vehicle sensor records a weight and a seating position of the vehicle occupant and a use of the vehicle belt to categorize the vehicle occupant.

* * * * *